US008830874B2

(12) United States Patent
Cho et al.

(10) Patent No.: US 8,830,874 B2
(45) Date of Patent: Sep. 9, 2014

(54) METHOD AND APPARATUS FOR LOAD BALANCING IN CELLULAR COMMUNICATION SYSTEM

(75) Inventors: Young-Kyu Cho, Incheon (KR); Ki-Back Kim, Seoul (KR); Jin-Hyun Youn, Hanam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 112 days.

(21) Appl. No.: 13/557,600

(22) Filed: Jul. 25, 2012

(65) Prior Publication Data

US 2013/0028093 A1    Jan. 31, 2013

(30) Foreign Application Priority Data

Jul. 25, 2011  (KR) .................. 10-2011-0073736

(51) Int. Cl.
| | | |
|---|---|---|
| H04L 12/28 | (2006.01) | |
| H04W 36/22 | (2009.01) | |
| H04L 12/56 | (2006.01) | |
| H04W 28/08 | (2009.01) | |

(52) U.S. Cl.
CPC .............. *H04W 28/08* (2013.01); *H04W 36/22* (2013.01); *H04L 47/125* (2013.01)
USPC ............ 370/255; 370/252; 370/331; 455/453

(58) Field of Classification Search
USPC .......................................... 455/453
See application file for complete search history.

(56) References Cited

U.S. PATENT DOCUMENTS

| | | | |
|---|---|---|---|
| 7,908,314 B2* | 3/2011 | Yamaguchi et al. .......... | 709/203 |
| 8,605,586 B2* | 12/2013 | Park et al. ..................... | 370/230 |
| 2010/0254279 A1 | 10/2010 | Choi et al. | |
| 2010/0325495 A1* | 12/2010 | Talla et al. ..................... | 714/49 |
| 2012/0236717 A1* | 9/2012 | Saska et al. ................... | 370/235 |

FOREIGN PATENT DOCUMENTS

KR    10-2010-0110194 A1    10/2010

* cited by examiner

*Primary Examiner* — Duc C Ho
(74) *Attorney, Agent, or Firm* — Jefferson IP Law, LLP

(57) ABSTRACT

A method and an apparatus for load balancing a serving subcell providing a data service to one or more user equipments in a cellular communication system are provided. The method includes calculating a load metric by using a radio resource occupation rate of data traffic in one or more scheduling types except for a Best Effort (BE) scheduling type, determining whether the serving subcell is in an overload state by using the load metric, and triggering a load balancing algorithm when it is determined that the serving subcell is in the overload state. Accordingly, the load metric used for load balancing may be defined to have a value closer to an actual free load, and thus the load balancing may be efficiently performed.

30 Claims, 10 Drawing Sheets

METHOD AND APPARATUS FOR LOAD BALANCING IN CELLULAR COMMUNICATION SYSTEM

PRIORITY

This application claims the benefit under 35 U.S.C. §119 (a) of a Korean patent application filed on Jul. 25, 2011 in the Korean Intellectual Property Office and assigned Serial No. 10-2011-0073736, the entire disclosure of which is hereby incorporated by reference.

BACKGROUND OF THE INVENTION

1. Field of the Invention

The present invention relates to a method and an apparatus for load balancing in a cellular communication system. More particularly, the present invention relates to a method and an apparatus for controlling a load between two cells by changing a terminal's access from a cell having a large load to a cell having a small load through a network-initiated HandOver (HO) (or Base Station (BS)-initiated handover) in an Orthogonal Frequency Division Multiplexing (OFDM) based wireless communication system such as Worldwide Interoperability for Microwave Access (WiMAX)/Long Term Evolution (LTE).

2. Description of the Related Art

In a 4th Generation (4G) mobile communication system, such as Worldwide Interoperability for Microwave Access (WiMAX)/Long Term Evolution (LTE), services having various service qualities (referred to as Quality of Service (QoS)) having about a 100 Mbps transmission rate are provided to users.

Such a 4th generation mobile communication system uses an Orthogonal Frequency Division Multiplexing (OFDM) scheme which is useful for high speed data transmission in a wired or wireless channel.

The OFDM scheme, which is a scheme for transmitting data by using a multi-carrier, is a type of a Multi Carrier Modulation (MCM) scheme for converting symbol columns input in serial to symbol columns in parallel, for modulating the symbol columns into a plurality of subcarriers having orthogonality, that is, a plurality of subcarrier channels, and for transmitting the modulated subcarrier channels.

When loads are concentrated in a particular subcell (or carrier) due to load unbalancing in the cellular communication system, side effects such as a network entry failure, a call blockage, a call drop, QoS deterioration, a total throughput deterioration and the like may be generated. Accordingly, even though the need for load balancing exists, load balancing is not likely to be implemented due to a difference between costs (e.g., radio resources, backhaul link bandwidth resources, power spent on an operation of hardware and the like) spent on implementing the load balancing and the user distribution/bandwidth demand.

In order to perform the load balancing in such a cellular communication system, it is important to accurately express a load metric, which is a function indicating a load of each cell. Efficient load balancing is possible only if an accurately expressed load metric is used.

A load indicator for expressing the load has been investigated in the related art. However, a method of accurately expressing the load indicator has not been considered in the related art. Further, it has been assumed in the related art that the selection of a handover target base station is performed by a terminal, but it is difficult to apply the load balancing by the terminal in the 4th generation module communication system, such as WiMAX/LTE, having a centralized scheduling in which the base station has full authority for DownLink (DL)/UpLink (UL) resource allocation.

In addition, there are attempts to use a number of awake users accessing a cell in order to calculate the load metric, or use a DL/UL burst occupancy of the cell as an overall radio resource utilization. However, in the related art, a method of obtaining information on the number of awake users is not specifically described, and it is difficult to determine system loads in a packet based wireless communication system based only on the number of users that are merely awake. Further, it is difficult to determine actual load amounts for the efficient use of resources only by using the burst occupancy for the calculation of the load amounts in a system providing elastic traffic such as Internet traffic.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address the above-mentioned problem and/or disadvantages and to provide a method and an apparatus for load balancing. Accordingly, an aspect of the present invention is to provide the method and the apparatus are described with reference to exemplary embodiments.

According to a first aspect of the present invention, a load metric is defined in consideration of a different Quality of Service (QoS) requirement according to data traffic between a network and a terminal and a different transmission rate according to a wireless channel state of a user, and a signaling overhead required for operating the terminal. Further, a method of using the load metric is provided.

According to a second aspect of the present invention, a method of transmitting the load metric or load state information between a plurality of cells is provided. For example, when one cell is operated by one base station, a method of guaranteeing an Inter Operability Test (IOT) requirement through the conformity of a related standard and transmitting the load state information while efficiently using a backhaul link bandwidth between base stations is provided.

According to a third aspect of the present invention, a condition for selecting a user equipment and a cell to which a network-initiated handover is applied for the load balancing is provided.

According to a fourth aspect of the present invention, an objective function for optimum load balancing in an aspect of a total network including a neighbor cell is provided.

According to a fifth aspect of the present invention, a method of removing a side effect due to a ping-pong phenomenon generated when the handover for the load balancing is performed using the network-initiated handover is provided.

According to a sixth, aspect of the present invention in order to minimize a side effect and a cost generated due to the load balancing, a method of recognizing an environment where a gain can be obtained through the load balancing and a load balancing method to which the method is applied.

In accordance with an aspect of the present invention, a method for load balancing a serving subcell providing a data service to one or more user equipments in a cellular communication system is provided. The method includes calculating a load metric by using a radio resource occupation rate of data traffic in one or more scheduling types except for a Best Effort (BE) scheduling type, determining whether the serving subcell is in an overload state by using the load metric, and triggering a load balancing algorithm when it is determined that the serving subcell is in the overload state.

In accordance with an aspect of the present invention, an apparatus for load balancing a serving subcell providing a data service to one or more user equipments in a cellular communication system is provided. The apparatus including a controller for calculating a load metric by using a radio resource occupation rate of data traffic in one or more scheduling types except for a BE scheduling type, for determining whether the serving subcell is in an overload state by using the load metric, and for triggering a load balancing algorithm when it is determined that the serving subcell is in the overload state.

Exemplary embodiments of the present invention can more efficiently perform the load balancing by defining the load metric used for the load balancing to be closer to the free load.

Exemplary embodiments of the present invention can prevent the unnecessarily frequent triggering by applying a condition for the triggering of the load balancing, and thus reduce overhead costs spent on the triggering.

Exemplary embodiments of the present invention can save operation resources of the apparatus by checking the load condition and the radio condition in calculating the objective function required for selecting the user equipment/subcell subject to the handover for the load balancing.

Exemplary embodiments of the present invention can minimize scans required for the handover and overhead due to a message exchange between subcells through the backhaul link, and operate a method and an apparatus for the load balancing in accordance with calculation amounts handled by an actual network system.

Further, exemplary embodiments of the present invention can operate such that overhead is minimized by recognizing a situation where gain cannot be obtained through various additional methods to prevent the QoS deterioration and the load balancing by itself, and thus adaptively operate while minimizing the side effect and the cost generated due to the load balancing.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
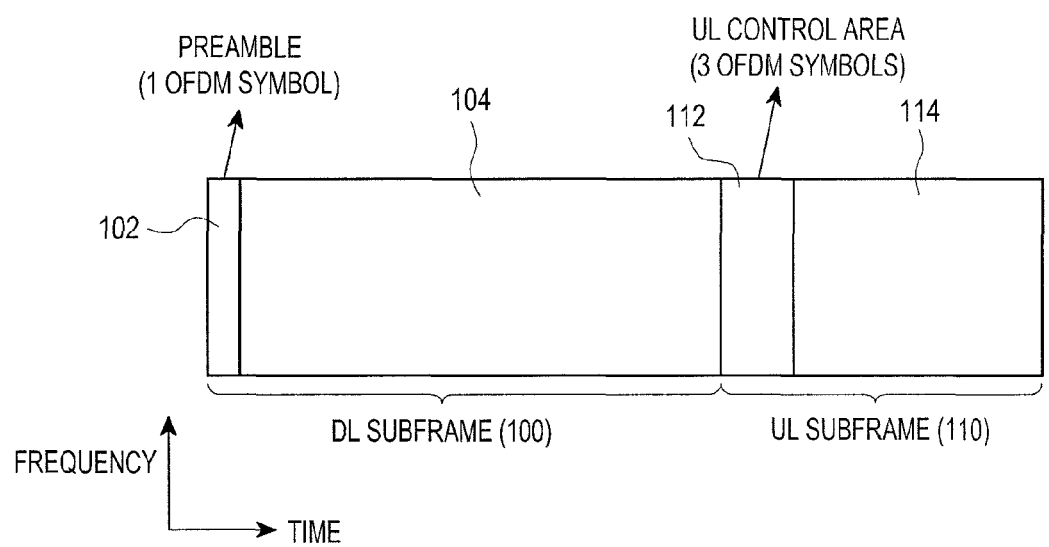
FIG. 1 illustrates radio resources used in load balancing in time and frequency domains according to exemplary embodiments of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Before the detailed description, the terms used in the present disclosure are defined.

The term "load balancing" used in this disclosure refers to achieving the balance of loads by controlling the loads between a serving subcell and another neighbor subcell (target subcell) through a method of performing a handover for a user terminal, and may be also be referred to as the term "load adjustment" and the like.

The term "subcell" used in this disclosure corresponds to an inclusive word having a meaning of a domain in which a resource is independently operated by a scheduler. That is, when a unit in which the resource is operated by the scheduler is one "cell", the "subcell" may refer to one "cell". Similarly, the "subcell" may be a "sector". Further, when one sector uses two or more "carriers" and a resource is operated by a separate scheduler in each carrier, the "subcell" may be the "carrier". It is noted that the term "subcell" may be used as a term having a meaning of a "Base Station (BS)" which is a subject operating the "subcell".

The terms "serving" and "target" used in this disclosure are used as terms for distinguishing a domain in which a user terminal currently receives a service and a domain in which the user terminal will receive a service after a handover, respectively.

The terms "user", "user terminal", "user equipment" and "terminal" used in this disclosure are all interpreted as words referring to a terminal (apparatus) of a user side receiving a service by the subcell.

1) A Definition of a Load Metric

A load metric to be used in a load balancing method according to exemplary embodiments of the present invention is defined.

In the definition of the load metric, characteristics of an Orthogonal Frequency Division Multiplexing (OFDM) based wireless wideband system (for example, Worldwide Interoperability for Microwave Access (WiMAX)/Long Term Evolution (LTE)) are considered. That is, since the OFDM based wireless wideband system applies an Adaptive Modulation and Coding (AMC), transmission for each user may be different, different types of wireless bearers exist to support different Quality of Service (QoS) requirements, and a radio resource is represented by a unit including a combination of a time domain and a frequency domain.

FIG. 1 illustrates radio resources used in load balancing in time and frequency domains according to exemplary embodiments of the present invention.

For example, in a case of a WiMAX system, DownLink (DL) traffic is scheduled to the remaining area 104 except for one symbol fixed to a preamble section 102 in a DL subframe 100, and UpLink (UL) traffic is scheduled to the remaining area 114 except for a UL control area 112 in a UL subframe 110. The UL control area refers to an area for a UL control signal, and generally includes three OFDM symbols.

Here, in a case of the DL, the traffic includes a broadcast Media Access Control (MAC) message including a DL/UL MAP, a Basic (B)/Primary (P)/Secondary (S)-Connection ID (CID) MAC management message, and data traffic according to five scheduling types. In a case of the UL, the traffic includes the B/P/S-CID MAC management message and the data traffic according to the five scheduling types (for example, Unsolicited Grant Service (UGS), extended real-time Polling Service (ertPS), real-time Polling Service (rtPS), non-real-time Polling Service (nrtPS), and Best Effort (BE)).

The DL/UL traffic is scheduled to radio resources including the time domain and the frequency domain in the unit of slots. In general, one DL slot is defined as (one sub channel× two OFDM symbols) and one UL slot is defined as (one sub channel×three OFDM symbols) in a sub channelization state of a Partial Usage Sub Channel (PUSC) used in a common system.

Further, data traffic has different QoS in aspects of a delay and a minimum reserved traffic rate. For example, in order to support the different QoS, the WiMAX system defines a service flow having five scheduling types such as UGS, ertPS, rtPS, rtPS, nrtPS, and BE, and provides a service by performing mapping in one of the scheduling types.

In the remaining scheduling types except for BE, since the minimum reserved traffic rate is defined by a QoS parameter, a number of slots may vary depending on whether an electric field condition of a user is good or bad even for the same parameter value. Further, the BE scheduling type has the lowest priority, but instead has characteristics capable of consuming all surplus radio resources regardless of a number of user equipments because the BE scheduling type provides a data traffic service having elastic characteristics. By considering the resource consumption characteristics of the BE scheduling type, the load metric may be defined as follows.

$$\text{LoadMetric} = \max(R_{non-BE,DL}, R_{non-BE,UL}) \quad (1)$$

In Equation (1), $R_{non-BE,\ DL}$ and $R_{non-BE,\ UL}$ denote occupation rates (unit: %) of slots used by all data traffic, the scheduling type of which is not BE (that is, non-BE), with respect to a number of all available slots in the DL and the UL, respectively. Further, max( ) denotes a function of obtaining a maximum value from arguments. That is, a higher value between slot occupation rates of the DL non-BE data traffic and the UL non-BE data traffic is used as a load metric representing a corresponding subcell. $R_{non-BE,\ DL}$ and $R_{non-BE,\ UL}$ corresponds to information which may be updated by a scheduler within the subcell (or base station) every several minutes in every frame based on a scheduled result.

Although the WiMAX system has been described as an example for the load metric, an LTE system may be equally applied.

2) A Trigger Time of a Load Balancing Algorithm

Figure 2:
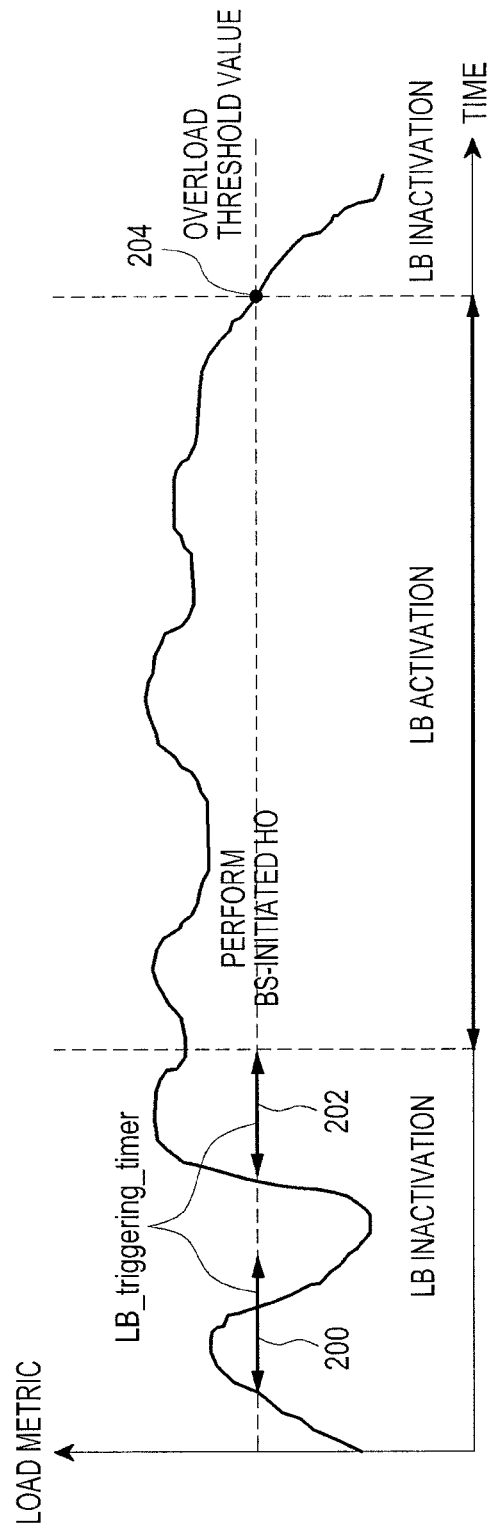
FIG. 2 illustrates a condition for triggering load balancing and an activated/deactivated state of load balancing based on the condition according to exemplary embodiments of the present invention.

FIG. 2 illustrates a condition for triggering load balancing and an activated/deactivated state of load balancing based on the condition according to exemplary embodiments of the present invention.

Since the load metric denotes the occupation rate of slots used by the data traffic, the load metric is increased in proportion to the increase in loads. When the load metric exceeds a particular overload threshold, a Load Balancing (LB) algorithm is executed.

When the load balancing algorithm is executed, an overloaded subcell selects a proper user and performs a handover of the user equipment to a neighbor subcell having a low load. To this end, a process in which the serving subcell receives load information of the neighbor subcell through a backhaul interface (for example, an R6 interface in WiMAX, an X2 or S1 interface in LTE and the like) and a process in which the serving subcell performs an unsolicited scan (which is not triggered by a request of the user equipment) in order to know whether the user equipment can access the neighbor subcell are needed. Further, an overhead such as a signaling is generated due to the performance of the unsolicited scan.

Although the load metric is used for a predetermined time window in order to determine the trigger time of the load balancing algorithm, a fluctuation of the load metric according to time is inevitable because an amount of demand for user data traffic and a capacity of the radio resources are fluctuated according to time. That is, considering the amount of demand for user data traffic and the capacity of the radio resources which are fluctuated according to time, executing the load balancing algorithm as soon as the load metric exceeds the overhead threshold value may be inefficient in a cost aspect of the overhead and the like. Accordingly, it is preferable to execute the load balancing algorithm after identifying whether a state where the load metric exceeds the overload threshold value continues for a particular time or a particular number of times.

LB_Triggering_Timer indicated by reference numerals 200 and 202 of FIG. 2 refers to a time for which the load metric having a value equal to or larger than OVLD_THR should last to trigger the load balancing. The parameter OVLD_THR refers to a threshold value for determining whether the serving subcell is in an overload state. Since the load metric is equal to or smaller than OVLD_THR for the LB_Triggering_Timer indicated by the reference number 200, the load balancing is not triggered. However, since the load metric continues to exceed OVLT_THR for the LB_Triggering_Timer indicated by the reference number 202, the load balancing is activated.

Meanwhile, when the load metric becomes equal to or smaller than the overload threshold value while the load balancing algorithm is activated 204, the load balancing algorithm is restrictively used by immediately making the load balancing deactivated.

Preferably, LB_Triggering_Timer is set to a value longer than a timescale in which the load metric is temporarily changed because of a factor such as a change in the Modulation and Coding Scheme (MCS) due to Bursty traffic or AMC. Optionally, LB_Triggering_Timer may be set to a value corresponding to several minutes.

When OVLD_THR is set to an excessively small value, most neighbor subcells are also recognized as being in the overload state, so that a target subcell to receive the load balancing disappears. Also, when OVLD_THR is set to an excessively large value, a probability to trigger the load balancing becomes low. Preferably, the load metric value is set to a value larger than OVLD_THR in subcells corresponding to 10 to 20% of subcells among all subcells.

3) An Operation when the Load Balancing is Activated

Figure 3:
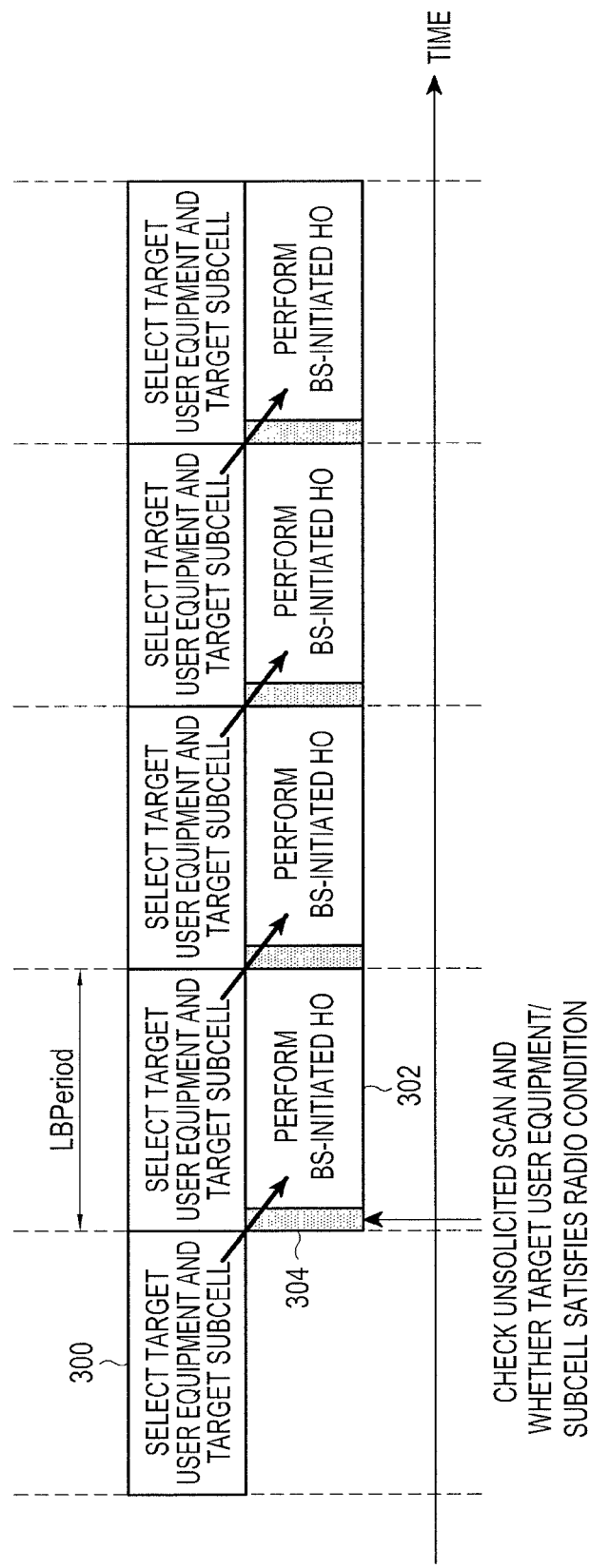
FIG. 3 illustrates an operation of an activated state of a load balancing algorithm according to an exemplary embodiment of the present invention.

FIG. 3 illustrates an operation of an activated state of a load balancing algorithm according to an exemplary embodiment of the present invention.

The serving subcell performs one or more operations of selection of a target user equipment and a target subcell, determination on whether a radio condition is satisfied for the performance of the handover, and the handover at a time interval corresponding a parameter LBPeriod while the load balancing algorithm is in an activated state through triggering. The parameter LBPeriod refers to a period on which the selection of the target user equipment and the target subcell is performed when the load balancing algorithm is triggered. Preferably, the parameter LBPeriod may be equally set to a period on which the neighbor subcell reports renewed load information. The selection of the target user equipment and the target subcell, and a determination on whether the radio condition is satisfied will be described below in detail.

The serving subcell performs the operation of selecting the target user equipment and the neighbor subcell for the load balancing and performs a Base Station initiated HandOver (BS initiated HO) (or network initiated HO) of the user equipment selected in a previous period to the corresponding neighbor subcell at the same time. That is, the target user and the target neighbor subcell having received the handover service in a LBPeriod section including the reference numeral 302 is a pair selected in a LBPeriod section including the reference numeral 300 before the X number of LBPeriods.

FIG. 3 assumes that X=1, that is, the handover is performed for the target user equipment and the target subcell selected in a previous period. The reason why there is a time interval between a time of selecting the target and a time of performing the handover is to determine 304 again whether a constraint condition considered at the time of selecting the target user equipment and the target subcell still exits at the time of performing the handover because a wireless channel environment changes according to time and the user is mobile. Accordingly, it is possible to reduce a probability of generating a ping-pong phenomenon (i.e., a phenomenon of generating a handover from a target subcell to another subcell (particularly, the serving subcell) through the terminal initiated scan or the load balancing operation performed after the handover)), and to guarantee requirements for the quality of the wireless subcell in the target subcell with a greater degree of confidence. Meanwhile, when the target user equipment and the target subcell are not selected, the handover is not performed in the following LBPeriod.

Figure 4:
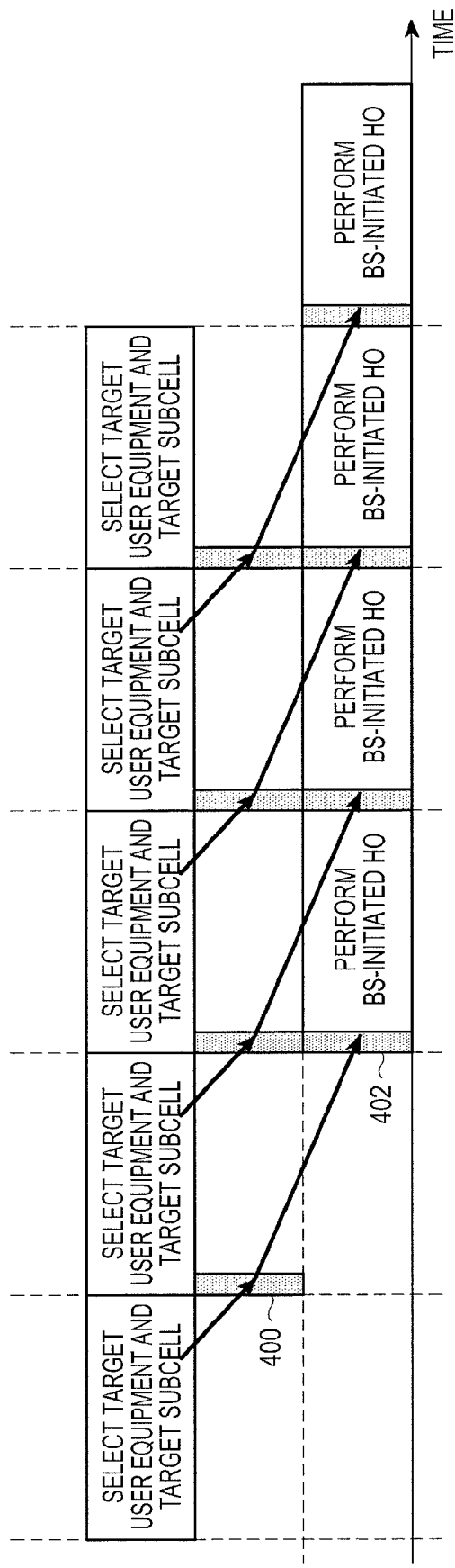
FIG. 4 illustrates an operation of an activated state of a load balancing algorithm according to another exemplary embodiment of the present invention.

FIG. 4 illustrates an operation of an activated state of a load balancing algorithm according to another exemplary embodiment of the present invention.

FIG. 4 describes the operation of the activated state of the load balancing algorithm when X=2. That is, it is determined whether the selected target user/subcell satisfies the radio condition over two LBPeriods (for example, the determination is made two times, both in reference numeral 400 and reference numeral 402). Only when the radio condition is satisfied both times, the handover is performed. Accordingly, it is possible to guarantee the requirements for the quality of the wireless channel in the target subcell with a greater degree of confidence (in comparison with a case where X=1).

4) An Operation when the Load Balancing is Triggered: Collect Neighbor Subcell Load Information Through a Backhaul A method of exchanging information on neighbor subcells used for selecting the target user equipment and the target subcell to receive the BS-initiated HO service is described as an example in the context of the WiMAX system. However, the method is similarly applicable to other wireless communication systems.

When the load balancing algorithm is triggered, the serving subcell transmits a Spare_Capacity_Request message defined in a WiMAX Network Working Group (NWG) R6 interface to a part or all of the subcells included in a neighbor subcell list, and a neighbor subcell having received the Spare_Capacity_Request message transmits a Spare_Capacity_Report message to the serving subcell.

Table 1 shows a format of the Spare_Capacity_Request message when the load balancing is triggered.

TABLE 1

| IE | LENGTH (OCTET) | VALUE | M/O |
|---|---|---|---|
| RRM Spare Capacity Report Type | 1 | | M |
| BS Info | | | M |
| >BS ID | 6 (802.16 BS ID) | | M |
| RRM Reporting Characteristics | 4 | | O |
| RRM Reporting Period P (initial value of 200 frames is used when omitted) | 2 | 400 | O |

Table 1 includes lengths, values, and requirements (M/O) of Information Elements (IEs) included in the Spare_Capacity_Request message. Particularly, the Spare_Capacity_Request message contains a Radio Resource Management (RRM) reporting period field, so that the neighbor subcell having received the Spare_Capacity_Request message transmits the Spare_Capacity_Report message in every period of the RRM reporting period.

Table 2 shows a format of the Spare_Capacity_Report message.

TABLE 2

| IE | LENGTH (OCTET) | VALUE | M/O |
|---|---|---|---|
| RRM Spare Capacity Report Type | 1 | | M |
| RRM BS Info | | | M |
| >BS ID | 6 (802.16 BS ID) | | M |
| >Available Radio | 1 | Upper 6 bits = floor | M |

TABLE 2-continued

| IE | LENGTH (OCTET) | VALUE | M/O |
|---|---|---|---|
| Resource DL | | (RDL, non-BE × 0.63) Lower 2 bits = floor (RDL, BE × 0.03) | |
| >Available Radio Resource UL | 1 | Upper 6 bits = floor (RUL, non-BE × 0.63) Lower 2 bits = floor (RUL, BE × 0.03) | M |
| Vendor Specific TLV | | | O |
| >HO Ind Readiness Timer | 1 | Number of awake users | M |

A function of "floor( )" used in Table 2 is a function of computing a maximum value among integers equal to or smaller than an argument.

The Spare_Capacity_Report message transfers a slot occupation rate (or utilization) of the non-BE data traffic and a slot occupation rate of the BE data traffic (that is, $R_{non-BE}$ and $R_{BE}$) for each of the DL/UL through an available radio resource DL/available radio resource UL field having a length of one octet. Since the non-BE slot occupation rate is used for the load metric, the non-BE slot occupation rate is 6 bit-quantized and the BE slot occupation rate is 2 bit-quantized, and then they are inserted in the Spare_Capacity_Report message and transmitted.

For example, when an Inter-Operability Test (IOT) between an Access Service network-GeteWay (ASN-GW) and a BS is not required because vendors of the ASN-GW and the BS are the same, the subcell can additionally transmit a number of awake user equipments serviced by the subcell (that is, itself) by using a Vendor Specific Type Length Value (TLV). Since the Vendor Specific TLV is an optional IE, it may not be transmitted when there are IOT requirements.

The reception side having received the Spare_Capacity_Report message reconstructs load information used for the load metric as follows.

RDL,non-BE=(float)(Available Radio Resource DL>>2)/0.63

RDL,BE=(float)(Available Radio Resource DL & 0x03)/0.03

RUL,non-BE=(float)(Available Radio Resource UL>>2)/0.63

RUL,BE=(float)(Available Radio Resource UL & 0x03)/0.03

In the reconstructed load information, "(float)" refers to a function of computing an argument in a real number type, ">>" refers to a bit operator indicating a bit movement in a right direction, and "&" refers to a bit operator indicating a bit logical AND operation.

Table 3 shows a format of the Spare_Capacity_Request message transmitted when the load balancing is deactivated.

TABLE 3

| IE | LENGTH (OCTET) | VALUE |
|---|---|---|
| RRM Spare Capacity Report Type | 1 | |
| RRM BS Info | | |
| >BS ID | 6 | (802.16 BS ID) |
| RRM Reporting Characteristics | 4 | 0000 |

When the load metric becomes equal to or smaller than the threshold value (OVLD_THR) and thus the load balancing algorithm is stopped, the serving subcell transmits the Spare_Capacity_Request message to the neighbor subcell which is transmitting the Spare_Capacity_Report message having the format shown in Table 3, so that the neighbor subcell does not transmit the Spare_Capacity_Report message any more. Accordingly, it is possible to prevent bandwidth resources of a backhaul link from being wasted. For example, it can be identified that a value of RRM Reporting Characteristics is set to "0000" in the Spare_Capacity_Request message of Table 3.

5) An Operation when the Load Balancing is Activated: Selection of the Target User Equipment/Subcell The operation of selecting the target user equipment and the target subcell performed every LBPeriod in the activated state of the load balancing algorithm may be performed through a process of calculating a solution of an optimization problem considering various conditions.

An objective function for solving the optimization problem may be established in consideration of the following five characteristics according to exemplary embodiments of the present invention. First, the remaining loads except for the non-BE load are considered as free loads. Second, the remaining loads except for a sum of the non-BE load and the BE load are considered as the free loads. Third, a sum of the remaining loads except for the sum of the non-BE load and the BE load and a quotient generated by dividing the BE loads by the number of awake users is considered as the free load. Fourth, different weights are assigned to the DL free load and the UL free load, and bottleneck free loads for the DL/UL are considered. Fifth, different weights are assigned to the radio condition and the free load, and total objective functions are considered.

The objective function of the optimization problem is given as a function having a DL/UL non-BE load metric for a neighbor subcell j and a Carrier to Interference-plus-Noise Ratio (CINR) value ($CINR_{subcell\,j}^{i}$) received by a candidate user equipment i in the neighbor subcell j. The following function may be considered according to whether the IOT on an R6 interface of WiMAX is required. When the IOT is not required, the serving subcell can receive information on the number of awake users through a Vendor Specific TLV as shown in Table 2.

The objective function according to exemplary embodiments of the present invention may be represented by the following two types according to whether the IOT is required.

When the IOT is required, that is, when information on the number of awake user equipments cannot be received from the neighbor subcell, the objective function may be represented as defined in Equation (2).

$$\rho_1 \times CINR_{subcell\,j}^{i} + \rho_2 \times \log(\max(100 - \max(R_{DL,non-BE}^{j}, R_{UL,non-BE}^{j}), 0.1)) \quad (2)$$

In Equation (2), $\rho_1$ and $\rho_2$ denote weights assigned to the CINR and the load metric, respectively when the load balancing optimization is determined.

The first and fifth characteristics of the five characteristics required for establishing the aforementioned objective function are reflected in Equation (2). That is, in the use of the load metric, the remaining loads except for the non-BE load are considered as free load, and the weights $\rho_1$ and $\rho_2$ are assigned to the radio condition (e.g., CINR) and the free load, respectively.

Meanwhile, when the IOT is not required, that is, when the information on the number of awake user equipments can be received from the neighbor subcell, the objective function may be represented as defined in Equation (3).

$$CINR_{subcell j}^{i} \times \left( \min \left\{ \begin{array}{l} \left( \begin{array}{l} w_1 \times (1 - R_{DL,non-BE}^{j} - w_2 \times R_{DL,BE}^{j}) + \\ w_3 \times \dfrac{R_{DL,BE}^{j}}{(N^j + 1)} \end{array} \right) \times w_4, \\ \left( \begin{array}{l} w_1 \times (1 - R_{UL,non-BE}^{j} - w_2 \times R_{UL,BE}^{j}) + \\ w_3 \times \dfrac{R_{UL,BE}^{j}}{(N^j + 1)} \end{array} \right) \end{array} \right\} \right) \quad (3)$$

In Equation (3), $w_1$ and $w_3$ refer to weights when fully empty resources are used and when resources used by the conventional BE data traffic is shared, respectively. Further, $w_2$ refers to a weight reflecting a degree of using the BE slot occupation rate by preempting slots used by the BE, and $w_4$ refers to a weight for normalizing a difference between DL and UL bandwidth demand amounts.

The second and third characteristics of the five characteristics required for establishing the aforementioned objective function are reflected in Equation (3). That is, in the use of the load metric, the remaining loads except for the sum of the non-BE load and the BE load are considered as the free loads as shown in $(1-R_{DL,non-BE}^{j}-w_2 \times R_{DL,BE}^{j})$, and the sum of values generated by dividing the BE loads by the number $(N^j+1)$ of awake user equipments are considered as the free loads as shown in $$\dfrac{R_{DL,BE}^{j}}{(N^j+1)}.$$

Further, by applying the weight $w_4$ to the DL free load, different weights are applied to the UL and DL free loads.

The problem of optimizing the objective function is that it has no solution in a closed form. Accordingly, operation amounts of the objective function are reduced by removing solutions in advance which do not satisfy constraint conditions (that is, radio conditions) from available solutions by using a data structure having a type, such as Table 4 shown below, and a method of finding an optimum solution is used. The restraint conditions refer to radio conditions required in an aspect of preventing the ping-pong phenomenon, minimizing signaling overhead on the air, guaranteeing the user's connectivity to the target subcell, and guaranteeing the service quality in order to robustly operate the load balancing algorithm according to the exemplary embodiments of the present invention even in an environment where the load or the wireless environment is changed.

A process of obtaining a user equipment/subcell optimizing the objective function by satisfying the radio condition may be represented as defined in Equation (4).

$$(i^*, j^*) = \underset{user \, i \in U, neighbor \, subcell \, j}{argmax} \, objective \left( \begin{array}{l} CINR_{subcell \, j}^{i}, R_{DL,non-BE}^{j}, \\ R_{UL,non-BE}^{j}, R_{DL,BE}^{j}, R_{UL,BE}^{j} \end{array} \right) \quad (4)$$

s.t.

1)

$\max(R_{DL,non-BE}^{j}, R_{UL,non-BE}^{j}) < $ OVLD_THR − RLTV_LOAD_THR

2) $RSSI_{subcell \, j}^{i} \geq minRSSIThreshold$ 3-a)

$CINR_{subcell \, j}^{i} \geq \max$

{$minCINRThreshold$, $CINR_{serving}^{i}$ − RLTV_CINR_THR}, if $CINR_{subcell \, j}^{i} < $ LB_MID_STR_CINR 3-b) $CINR_{subcell \, j}^{i} \geq minCINRThreshold$, otherwise Table 4 shows an example of a structure of data to be used for determining whether the constraint condition is satisfied for each user equipment and for each subcell in order to select a target user equipment/subcell according to exemplary embodiments of the present invention.

TABLE 4

| | | Scan Result | | | | |
|---|---|---|---|---|---|---|
| Active Users | CINR @ Serving Subcell | Neighbor subcell 1 | Neighbor subcell 2 | Neighbor subcell 3 | Neighbor subcell 4 | Neighbor subcell 5 |
| B-CID 1 | | RSSI: CINR: | RSSI: CINR: | RSSI: CINR: | RSSI: CINR: | RSSI: CINR: |
| B-CID 2 | | RSSI: CINR: | RSSI: CINR: | RSSI: CINR: | RSSI: CINR: | RSSI: CINR: |
| B-CID 3 | | RSSI: CINR: | RSSI: CINR: | RSSI: CINR: | RSSI: CINR: | RSSI: CINR: |
| ... | | ... | ... | ... | ... | ... |
| B-CID N | | RSSI: CINR: | RSSI: CINR: | RSSI: CINR: | RSSI: CINR: | RSSI: CINR: |

Table 4 illustrates a case where there are N awake user equipments distinguished by a B-CID and five neighbor subcells.

First, by using constraint condition 1) in Equation (4), a column corresponding to a neighbor subcell which does not satisfy a condition of $\max(R_{DL,non-BE}^{j}, R_{UL,non-BE}^{j}) < $ OVLD_THR−RLTV_LOAD_THR is removed from subcells subject to the objective function calculation. For example, it is assumed in Table 4 that columns corresponding to neighbor subcells 1, 3, and 5 do not satisfy the condition, so that they may be removed from the subcells subject to the calculation. Accordingly, neighbor subcells 2 and 4 exist (remain) as subcells satisfying the load metric condition.

Constraint condition 1) in Equation (4) corresponds to a condition which makes the load of the target subcell not exceed the overload threshold value (OVLD_THR) although the handover of the target user equipment to the target subcell is performed as a result of the load balancing by making the load metric of a candidate neighbor subcell smaller than OVLD_THR−RLTV_LOAD_THR. Accordingly, the user equipment can report of a CINR/Received Signal Strength Indicator (RSSI) only for the candidate neighbor subcell satisfying the constraint condition 1) through the unsolicited scan. In the WiMAX system, the neighbor subcell (or base station) to be scanned may be indicated by a full BS ID of a corresponding base station or an index of neighbor information in a MOB_SCN-RSP message. If there is no candidate neighbor subcell satisfying the constraint condition 1), the target user equipment/subcell selecting operation is terminated without the unsolicited scan operation. Accordingly, it is possible to prevent the uselessly performed scan operation. Here, RLTV_LOAD_THR refers to a parameter used as the constraint condition together with OVLD_THR when the target user equipment/subcell is selected, in order to prevent the target subcell from entering the overload state through the load balancing. RLTV_LOAD_THR is determined based on the fact that a number of selectable candidate subcells is too small when RLTV_LOAD_THR is too large.

Subsequently, when there is the neighbor subcell satisfying the load metric condition, unsolicited SCN-RSP/SCN-REP is performed for each awake user equipment. When neighbor subcells 2 and 4 are neighbor subcells satisfying the load metric condition in Table 4, it is determined whether values of the RSSI and the CINR for the neighbor subcells 2 and 4 satisfy constraint conditions 2) and 3) in Equation (4), and a (user equipment/subcell) pair which does not satisfy the condition is additionally removed from the objective function calculation target. The unsolicited SCN-RSP message refers to a message instructing the user equipment on the unsolicited scan by the serving subcell, and the SCN-REP message refers to a message reporting the serving subcell of a result of the scan by the user equipment.

The constraint conditions 2) and 3) are to prevent the ping-pong phenomenon and guarantee the connectivity, and guarantee such that a wireless channel state which the user equipment experiences in the candidate neighbor subcell becomes equal to or larger than a particular minimum value in aspects of the RSSI and the CINR. Particularly, when it is expected to generate the ping-pong phenomenon in the target subcell after the handover (that is, $CINR_{subcell j}^i < LB\_MID\_STR\_CINR$), the handover to the serving subcell is not generated through an additional determination of $CINR_{subcell j}^i \geq CINR_{serving}^i - RLTV\_CINR\_THR$.

At this time, LB_MID_STR_CINR refers to a CINR value of the serving subcell which is a reference for determining whether a ping-pong preventing condition is added to a candidate user equipment CINR requirement in the target subcell when the target user equipment/subcell is selected. Preferably, LB_MID_STR_CINR is set to a value equal to or slightly larger than the CINR value with which the user equipment triggers the scan because the handover to the serving subcell is performed again, and thus the ping-pong phenomenon may be generated when the user equipment initiated scan (or MS-initiated scan) is triggered.

The constraint conditions 2) and 3) in Equation (4) may be used for the purpose of indirectly controlling the service quality in the target subcell for the corresponding user equipment. For example, when high minCINRTHreshold and minRSSIThreshold are set, numbers of user equipments to receive the handover service and elements of a candidate set of the neighbor subcells are reduced, but it is possible to expect a high data transmission rate in the target subcell. At this time, minCINRTHreshold corresponds to a minimum requirement for the candidate user equipment CINR in the target subcell when the target user equipment/subcell is selected. Preferably, minCINRTHreshold is set to a value smaller than the CINR value with which the user equipment triggers the scan in the target subcell by 1 to 2 dB. Further, minRSSIThreshold corresponds to a minimum requirement for the candidate user equipment RSSI in the target subcell when the target user equipment/subcell is selected. Preferably, minRSSIThreshold may be determined using minCINRTHreshold based on the correlation between the RSSI and the CINR obtained through a driving test in a common network environment.

As described above, when the (user equipment and subcell) pairs which do not satisfy the radio condition are all removed, objective functions for the remaining (user equipment and subcell) pairs are calculated, and a (user equipment and subcell) pair having a maximum value is determined as the target user equipment and the target subcell.

Since the number of awake user equipments for each subcell may be equal to or larger than 100 in an actual system and there may exist a maximum of 32 neighbor subcells, if the above solution is used for all user equipments, operation amounts overstrain the real time operations.

Further, the operation in which the serving subcell transmits the unsolicited SCN-RSP to total user equipments and receives the SCN-REP from the total user equipments in every LBPeriod acts as a significant burden in an aspect of the wireless overhead. Accordingly, the target user equipment/subcell selecting operation is performed only for a number of users corresponding to the LB_MAX_NUM_SCAN parameter in every LBPeriod among the set of awake user equipments, and the target user equipment/subcell selecting operation is performed for another number of awake user equipments corresponding to BL_MAX_NUM_SCAN according to an order of the round-robin in the next LBPeriod. LB_MAX_NUM_SCAN refers to a number of candidate user equipments considered by the target user equipment/subcell selecting algorithm for each LBPeriod. An optimum pair may be found as the LB_MAX_NUM_SCAN parameter is large, but the trade-off in which the overhead is increased due to operation amounts and the scan operation is generated.

Figure 5:
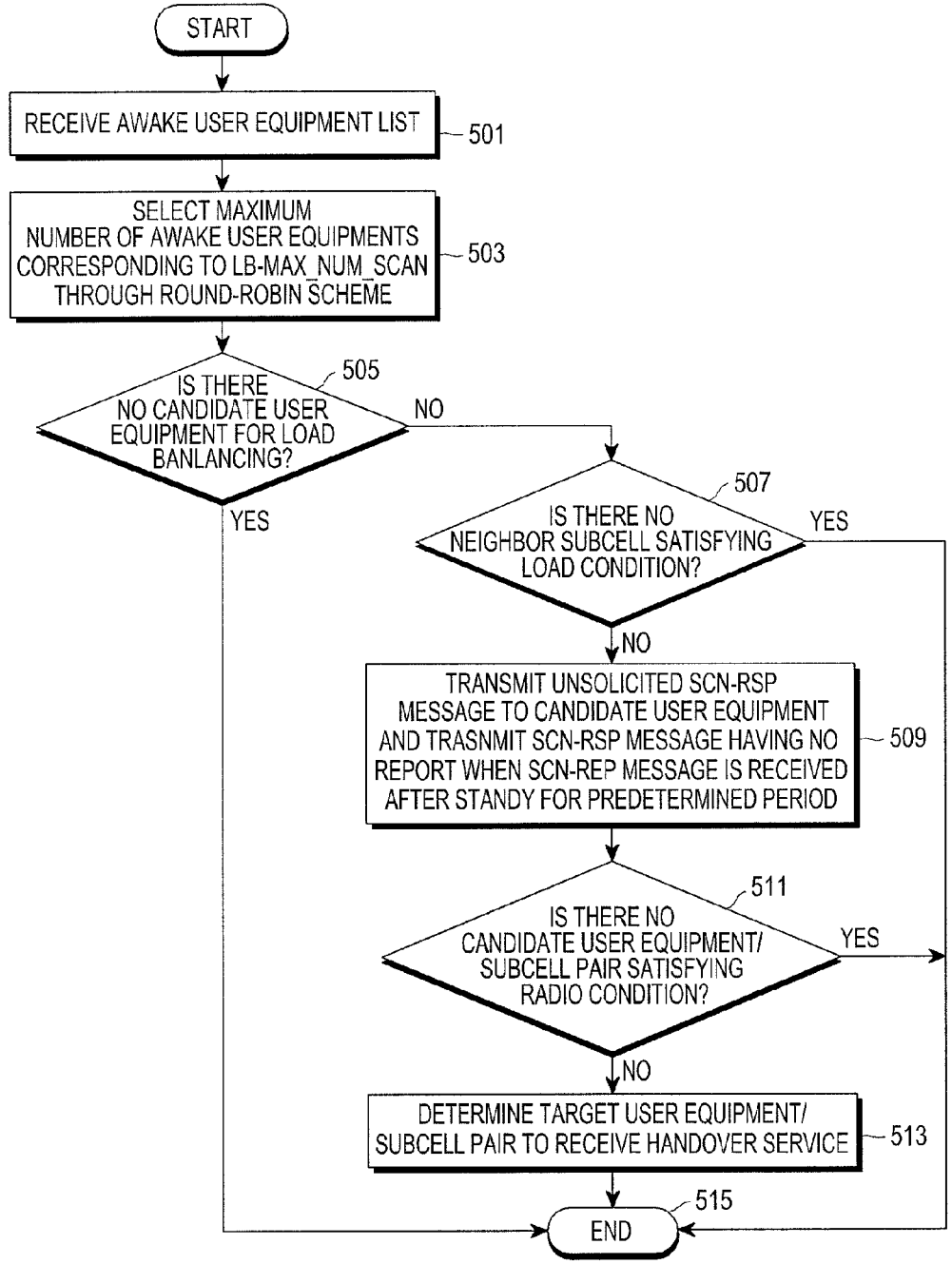
FIG. 5 illustrates a target user and a target subcell selecting method according to an exemplary embodiment of the present invention.

FIG. 5 illustrates a target user equipment and a target subcell selecting method according to an exemplary embodiment of the present invention.

The serving subcell receives a list of awake user equipments in step 501.

The serving subcell selects a number of awake user equipments corresponding to LB_MAX_NUM_SCN from all the awake user equipments through a round-robin scheme in step 503.

The serving subcell determines whether there is no queue of the candidate user equipments to perform the Load Balancing (LB) in step 505. When it is determined that there is no queue of the candidate user equipments, the target user equipment/subcell selecting algorithm is terminated in step 515. When it is determined that there is a queue, step 507 is performed.

The serving subcell determines whether the neighbor subcell satisfies the load condition in step 507. At this time, constraint condition 1) in Equation (4) may be used.

When it is determined that there is no neighbor subcell satisfying the load condition in step 507, the serving subcell terminates the target user equipment/subcell selecting algorithm in step 515. When it is determined that there is a neighbor subcell, step 509 is performed.

The serving subcell transmits the unsolicited SCN-RCP message to the candidate user equipment, and transmits the SCN-RSP message (SCN-RSP w/no report) having no report when receiving the SCN-REP message after waiting for a predetermined time in step 509. The serving subcell determines whether the candidate user equipment/subcell pair satisfies the radio condition in step 511.

If it is determined in step 511 that there is not a candidate user equipment/subcell pair that satisfies the radio condition, the serving subcell terminates the target user equipment/subcell selecting algorithm in step 515. However, if it is determined in step 511 that there is a candidate user equipment/subcell pair that satisfies the radio condition, the serving subcell calculates an objective function for the candidate user equipment/subcell pair satisfying the radio condition, and determines a user equipment/subcell pair optimizing (that is, maximizing) the objective function as a target user equipment/subcell which is a target of the handover in step 513. Thereafter, the serving subcell terminates the target user equipment/subcell selecting algorithm in step 515.

6) An Optimization for a Set of Awake User Equipments

An extendable configuration will be described based on the configuration of the target user equipment/subcell selecting algorithm of FIG. 5.

The above described basic algorithm for selecting the target user equipment/subcell considers all awake user equipments within the subcell as candidates of the load balancing. Preferably, a set of the awake user equipments corresponding to a candidate group of the target user equipments may be optimized as follows.

In general, it is difficult for the handover to be performed for a user equipment (for example, user equipment in a strong CINR area) in a strong electric field located very near the base station, and its load balancing effect through the handover is not big in comparison with the handover for a user equipment in a weak electric field. Accordingly, it is preferable that a user equipment having a value equal to or larger than a predetermined threshold value based on the CINR of the serving subcell is excluded in advance from the candidate to which the load balancing method is to be applied. Therefore, the user equipment excluded from the candidate of the target user equipments can remove a time for which communication with the subcell is stopped due to the unsolicited scan, and can reduce overhead spent on a total system due to the scan operation. The predetermined threshold value is defined by a LB_MAX_CINR_THR parameter. That is, the LB_MAX_CINR_THR parameter refers to a parameter for limiting such that only a user equipment having a value equal to or smaller than a particular CINR for the serving subcell is included in a candidate user equipment set. Preferably, the LB_MAX_CINR_THR parameter may be set based on a strong electric field at a level requiring to be excluded from the user equipment set subject to the load balancing in consideration of a network design.

Further, in a case where the user equipment initially accesses a network (Initial Network Entry: INE), if the user equipment returns to an awake state from an idle mode (Quick Connection Setup: QCS), and if the user equipment enters the network through the handover, it is preferable to exclude the user equipment from the candidate group for the load balancing during a predetermined time in an aspect of QoS of the corresponding user equipment and an aspect to prevent the ping-pong phenomenon. To this end, by defining a LB_BLOCK_TIMER parameter, a user equipment which does not have a join time for the corresponding subcell equal to or longer than LB_BLOCK_TIMER through the INE, QCS, and handover is excluded from the load balancing candidate.

Furthermore, a user equipment which is performing voice communication (for example, a Voice over Internet Protocol (VoIP) service) may have a low QoS due to handover because a traffic delay is generated in the handover process and also data communication is not available during the scan operation which should be performed for the handover. For example, in the WiMAX system, the voice communication uses scheduling types such as UGS, ertPS and the like, so that it is preferable that a user equipment using a corresponding type of service flow in which data traffic is flowing is excluded from the load balancing candidate or has a low priority of being the candidate.

7) An Optimization for the Subcell where Overlapping Carriers Located in the Same Position Exist When two or more carriers are arranged in one sector, the "subcell" according to an exemplary embodiment of the present invention may refer to each of the carriers. At this time, since coverage characteristics between the two carriers are generally similar, it is possible to try the load balancing without the unsolicited scan operation based on an inference that if an access to one carrier (that is, serving subcell) is possible, an access to the other carrier (that, neighbor subcell) is possible. Accordingly, the overhead due to the scan may be reduced.

The objective function for selecting a target neighbor carrier is defined by considering only a term related to the load. Carriers within the same sector can know a number of a counterpart's awake user equipments through Inter-Process Communication (IPC), so that the objective function may be represented as defined in Equation (5) by using information on the number of awake user equipments.

$$\min \left( \begin{array}{l} \left( w_1 \times (1 - R^j_{DL,non-BE} - w_2 \times R^j_{DL,BE}) + w_3 \times \dfrac{R^j_{DL,BE}}{(N^j + 1)} \right) \times w_4, \\ w_1 \times (1 - R^j_{UL,non-BE} - w_2 \times R^j_{UL,BE}) + w_3 \times \dfrac{R^j_{UL,BE}}{(N^j + 1)} \end{array} \right) \quad (5)$$

A target user equipment selecting method and a constraint condition (radio condition) may be represented as defined in Equation (6).

$$\text{Target User Selection: } i^* = \operatorname*{argmin}_{user\ i \in U} CINR^i_{subcell\ j} \quad (6)$$

s.t.

$$CINR^i_{subcell\ j} \geq \max \left( \begin{array}{l} \text{LB\_MID\_STR\_CINR,} \\ minCINRThreshold \end{array} \right)$$

Since an interference environment may be different for each carrier, a user equipment having the smallest serving CINR is selected from awake user equipments having a CINR (that is, serving CINR) larger than a maximum (LB_MID_STR_CINR, minCINRThreshold) as a target user equipment. Here, the reason why the LB_MID_STR_CINR parameter is used is that the LB_MID_STR_CINR parameter is set in accordance with the CINR value, and thus the user equipment initiated scan (or MS initiated scan) is not triggered when the CINR value is larger than the parameter, thereby not generating the handover and reducing the probability of generating the ping-pong phenomenon.

A target neighbor carrier selecting method and a constraint condition (radio condition) may be represented as defined in Equation (7).

$$\text{Target Subcell Selection: } j^* = \quad (7)$$

$$\operatorname*{argmax}_{neighbor\ subcell\ j} objective(R^j_{DL,non-BE}, R^j_{UL,non-BE}, R^j_{DL,BE}, R^j_{UL,BE})$$

s.t.

$$\max(R^j_{DL,non-BE}, R^j_{UL,non-BE}) < OVLD\_THR - RLTV\_LOAD\_THR$$

The methods of applying Equations (6) and (7) are the same as that of Equation (4), so a detailed description will be omitted.

Figure 6:
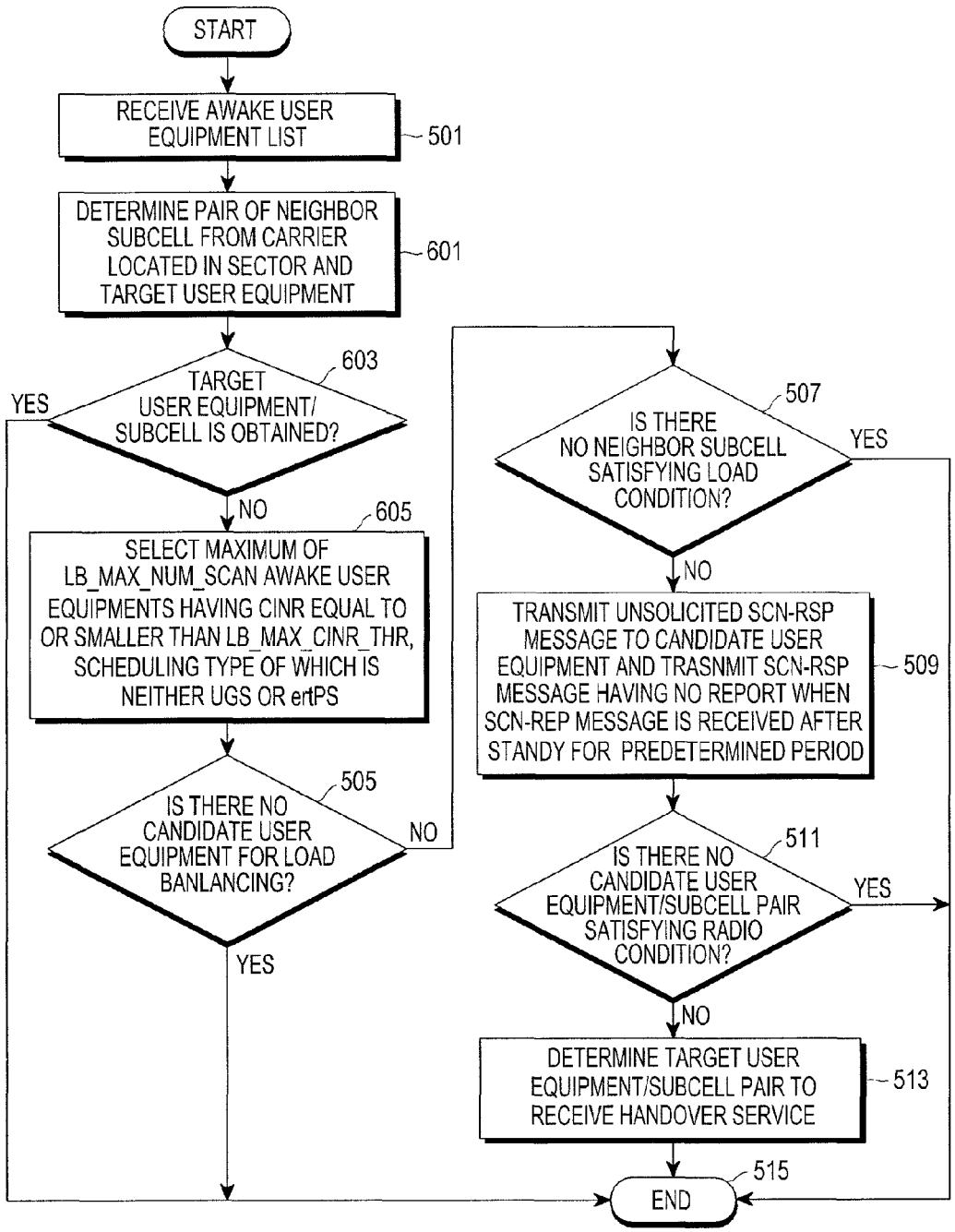
FIG. 6 illustrates a target user and a target subcell selecting method according to another exemplary embodiment of the present invention.

FIG. 6 illustrates a target user and a target subcell selecting method according to another exemplary embodiment of the present invention.

FIG. 6 shows an example of a method of applying an optimization scheme of selecting a user equipment and an optimization scheme in which one sector uses two or more carriers to the above described target user equipment/subcell selecting method of FIG. 5. Steps 601, 603, and 605 are added to FIG. 6 instead of step 503 in comparison with FIG. 5.

The serving subcell receives the number of awake user equipments in step 501, and determines a pair of target user equipment and a target subcell in step 601. Here, the target subcell may be a target carrier to receive a handover service among the two or more carriers arranged together within one sector.

The serving subcell (or carrier) determines whether the target user equipment and the target subcell (or target carrier) are obtained in step 603, and terminates the selecting algorithm when they are obtained in step 515 and proceeds to step 605 when they are not obtained.

In order to prevent the handover of a user equipment in a strong electric field in which it is difficult to expect a load balancing effect and to guarantee voice communication and a seamless service, the serving subcell (or carrier) does not have a service flow such as the UGS or the ertPS, and selects a maximum of LB_MAX_NUM_SCAN awake user equipments having a CINR equal to or smaller than LB_MAX_CINR_THR through the round-robin scheme in step 605.

The remaining processes are the same as those of FIG. 5, so a detailed description will be omitted.

8) A Scan Overhead Minimizing Scheme According to a Result of Target User Equipment/Subcell Selection When an electric field environment of the user equipment does not satisfy the RSSI and the CINR constraint condition although there is a neighbor subcell (that is, neighbor subcell having a sufficiently low load metric) satisfying the load condition according to a network state, only the signaling overhead due to the unsolicited scan operation is generated without the load balancing through the handover. Whenever the scan operation is generated, communication between the user equipment and the serving subcell is stopped, and thus a total throughput is reduced. Further, since the SCN-RSP/REP message transmitted during the scan operation is included in the MAC management message, the SCN-RSP/REP message is scheduled with a high priority and may affect the QoS of another user equipment. Accordingly, it is required to prevent the signaling overhead due to the scan operation from being generated by recognizing whether the environment is an environment where the load balancing can be performed by itself.

Hereinafter, the remaining two parameters are defined, and they are used for recognizing whether the environment is an environment where the load balancing can be performed.

First, LB_NOT_TRIGGERED_BY_LOAD_CONDITION is defined as a parameter related to a case where the load condition is not satisfied. When a target subject to the handover is not determined since all neighbor subcells do not satisfy the load condition in the target user equipment/subcell selecting process in every LBPeriod, LB_NOT_TRIGGERED_BY_LOAD_CONDITION is increased by 1.

Further, LB_NOT_TRIGGERED_BY_AIR_CONDITION is defined as a parameter related to a case where the radio condition is not satisfied. When the target is not determined since the CINR/RSSI constraint condition is not satisfied as a result of the unsolicited scan in the target user equipment/subcell selecting process in every LBPeriod, LB_NOT_TRIGGERED_BY_AIR_CONDITION is increased by 1.

The two parameters apply the target user equipment/subcell selecting algorithm to all awake user equipments participating in the load balancing according to an order of the round-robin scheme, and are initialized whenever one round is completed.

As described above, the scan operation is performed only when at least one neighbor subcell satisfying the load constraint condition exists. Accordingly, although there is a neighbor subcell (that is, neighbor subcell having a sufficiently low load) satisfying the load condition, the load balancing cannot be performed under the following condition equation since the electric field distribution of the user equipment does not satisfy the RSSI/CINR constraint condition. The condition equation may be represented as defined in Table 5.

TABLE 5

(LB_NOT_TRIGGERED_BY_LOAD_CONDITION == 0) &&
(LB_NOT_TRIGGERED_BY_AIR_CONDITION == a number of times of the target user equipment and target subcell selection tried within one round That is, a case where the parameter LB_NOT_TRIGGERED_BY_LOAD_CONDITION is "0" (meaning that there is no case where the neighbor subcell is not selected due to non-satisfaction of the load condition) and the parameter LB_NOT_TRIGGERED_BY_AIR_CONDITION is the same as the number of times of the selection operations tried within one round (that is, meaning that there is no generation of the load balancing at all due to non-satisfaction of the radio condition of the user equipment) is determined as a case where the handover is not generated although the unsolicited scan is performed since there is the neighbor subcell satisfying the load condition.

When a number of times of rounds satisfying the condition equation included in Table 5 is indicated by "K (initial value 0)", the target user equipment/subcell selecting operation is skipped for LBPeriod as defined in Equation (8), and then the target user equipment/subcell selecting operation is performed again.

$$\begin{cases} 0, & K = 0 \\ \min(\text{MAX\_SKIP\_PERIOD}, 2^{(K-1)}), & K > 0 \end{cases} \quad (8)$$

That is, when a state where the load balancing is not available continues due to the electric field environment of the user equipment, it is possible to minimize the signal overhead due to the unsolicited scan operation by exponentially increasing LBPeriod, and not performing the target user equipment/subcell selecting operation. Here, a MAX_SKIP_PERIOD parameter refers to an upper bound value of a number of LBperiod to be skipped when it is determined that there is no gain obtained by the load balancing. That is, the MAX_SKIP_PERIOD parameter may be determined to have a value corresponding to a minimum number of frequencies that the load balancing has been attempted in spite of the overhead due to the scan operation.

Figure 7:
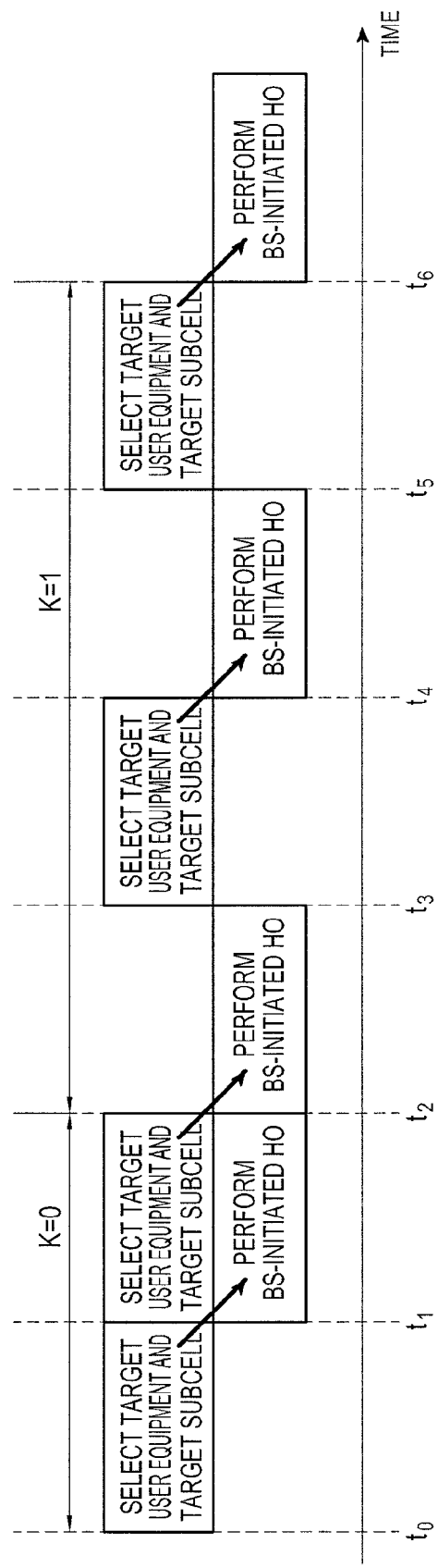
FIG. 7 illustrates an operation in which a scheme of minimizing signaling overhead is applied in an activated state of a load balancing algorithm according to exemplary embodiments of the present invention.

FIG. 7 illustrates an operation in which a scheme of minimizing signaling overhead is applied in an activated state of a load balancing algorithm according to exemplary embodiments of the present invention.

When the load balancing algorithm is triggered and thus the load balancing is in the activated state, the serving subcell performs the target user equipment/subcell selecting operation in every LBPeriod. When it is assumed in an example of FIG. 7 that two target user equipment/subcell selecting operations consist of one round, the load balancing algorithm is triggered at a time point $t_0$, one round of which is terminated at a time point $t_2$ after two LBPeriods have passed.

After one round is terminated (at the time point $t_2$), the serving subcell determines whether the condition equation of Table 5 is satisfied. When the condition equation is satisfied and it is determined that only the signaling overhead due to the scan is generated without the performance of the handover for the load balancing, a value of K is increased by "1". According to the increase in the value of K, a number of times of omissions of the target user equipment/subcell selecting operations is exponentially increased by Equation (8).

The serving subcell having increased the value of K to "1" does not perform the target user equipment/subcell selecting operation from the time point $t_2$ during one (a result value of min(MAX_SKIP_PERIOD, $2^{(K-1)}$) when K is "1") LBPeriod, and performs the target user equipment/subcell selecting operation at the time point $t_3$.

Although not illustrated in the drawing, the serving subcell again determines whether the condition equation of Table 5 is satisfied at a time point $t_7$ when a second round is terminated. When the condition equation is satisfied, the number of omission times of the target user equipment/subcell selecting operations may be exponentially increased according to Equation (8) by additionally increasing the value of K by "1".

Figure 8A:
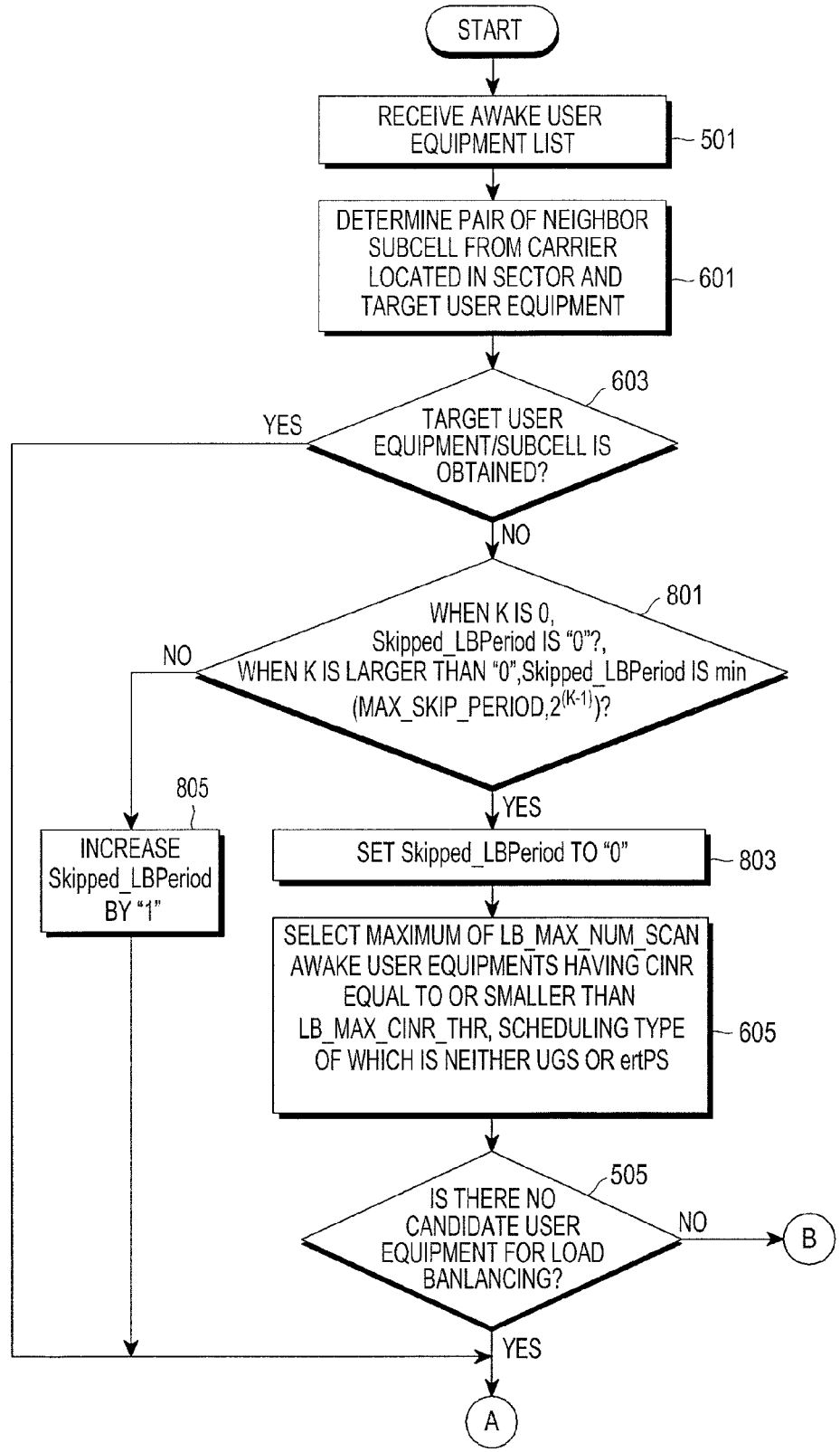
FIGS. 8A and 8B illustrate a target user and a target subcell selecting method according to yet another exemplary embodiment of the present invention.
Figure 8B:
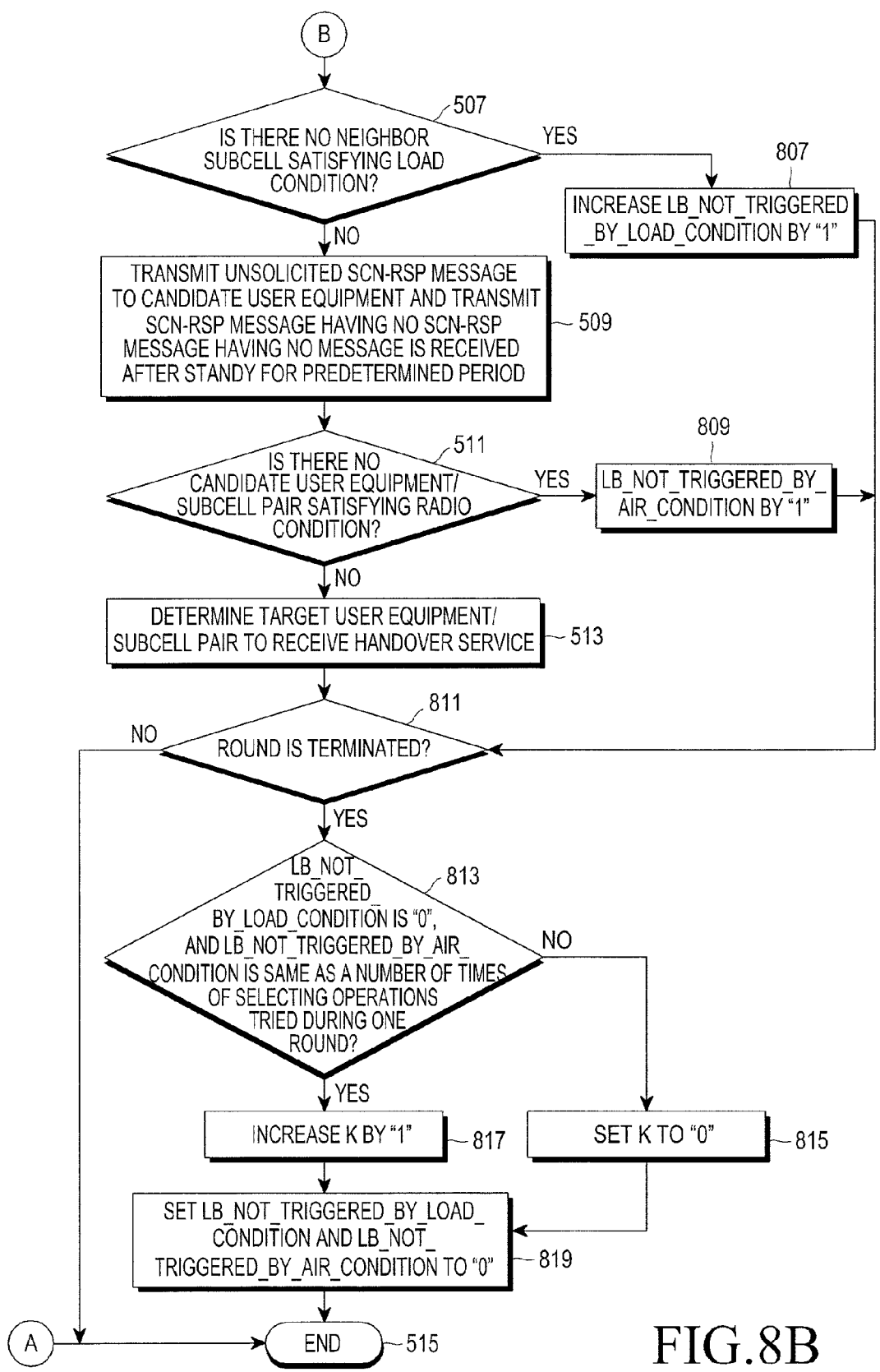

FIGS. 8A and 8B illustrates a target user and a target subcell selecting method according to yet another exemplary embodiment of the present invention.

FIGS. 8A and 8B shows an example of a method of additionally implementing a scheme of minimizing the scan overhead in the target user equipment/subcell selecting method by using a result of the selection. Steps 801 to 819 are additionally performed in FIGS. 8A and 8B in comparison with FIG. 6. The remaining configurations except for steps 801 to 819 are the same those of FIG. 6, so a detailed description will be omitted.

In step 801, the serving subcell determines whether a number of times (hereinafter, referred to as "Skipped_LBPeriod") of the skipped target user equipment/subcell selecting operations is the same as the value obtained by Equation (8). That is, when K is "0", the serving subcell determines whether Skipped_LBPeriod is "0". When K is larger than "0", the serving subcell determines whether Skipped_LBPeriod is min(MAX_SKIP_PERIOD,2(K−1)).

When Skipped_LBPeriod is the same as the value defined by Equation (8) as a result of the determination in step 801 (that is, when a number of times of selection to be skipped is "0" or omissions corresponding to a number of times of selecting operations are already made), the serving subcell proceeds to step 803, sets a value of Skipped_LBPeriod to "0", and performs target user equipment/subcell selecting operations before step 605.

Meanwhile, when Skipped_LBPeriod is not the same as the value defined by Equation (8) as the result of the determination in step 801 (that is, when the selecting operations corresponding to the value of Equation (8) are not skipped), the serving subcell proceeds to step 805, and increases the value of Skipped_LBPeriod by 1. Then, the serving subcell skips the target user equipment/subcell selecting operation by proceeding to step 515.

As described above, it is determined whether there is the neighbor subcell satisfying the load condition in step 507. When there is the neighbor subcell as a result of the determination in step 507, step 509 is performed, and thus a next operation is performed. When there is no neighbor subcell, step 807 is additionally performed. LB_NOT_TRIGGERED_BY_LOAD_CONDITION which is the parameter related to a case where the load condition is not satisfied is increased by 1 in step 807, and then step 811 is performed.

Further, as described above, it is determined whether there is the user equipment/subcell pair satisfying the radio condition in step 511. When there is a pair satisfying the radio condition as a result of the determination in step 511, step 513 is performed, and thus the handover process for the load balancing is performed. When there is no pair satisfying the radio condition, step 809 is additionally performed. LB_NOT_TRIGGERED_BY_AIR_CONDITION, which is the parameter related to a case where the radio condition is not satisfied, is increased by 1 in step 809, and then step 811 is performed.

In step 811, the serving subcell determines whether the round is terminated.

When it is determined that the round is terminated, the serving subcell determines whether the condition equation (determination on a case where the scan overhead is generated due to non-satisfaction of the radio condition, but the handover for the load balancing is not generated) is satisfied in Table 5 in step 813.

When the condition equation in Table 5 is satisfied as a result of the determination in step 813, the value of K is increased by 1 in step 817. Otherwise, the value of K is initialized to "0" in step 815.

Subsequently, the serving subcell initializes the parameters LB_NOT_TRIGGERED_BY_LOAD_CONDITION and LB_NOT_TRIGGERED_BY_AIR_CONDITION to "0" in step 819. Thereafter, the target user equipment/subcell selecting algorithm proceeds to step 515 and is terminated.

9) An Apparatus of the Subcell Applying the Load Balancing Method

The above described load balancing method may be performed in an apparatus of the base station performing the scheduling of the subcell. That is, the load balancing method may be implemented in all types of base station apparatuses performing the scheduling of the "cell", "subcell", "sector", and "carrier".

Figure 9:
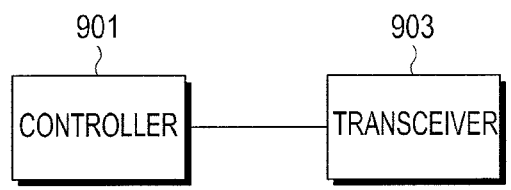
FIG. 9 illustrates a configuration of a subcell apparatus for implementing a load balancing method according to exemplary embodiments of the present invention.

FIG. 9 illustrates a configuration of a subcell apparatus for implementing a load balancing method according to exemplary embodiments of the present invention.

A controller 901 of the subcell performs methods of defining and calculating the load metric, triggering and inactivating the load balancing algorithm, selecting the target user equipment/subcell in the load balancing activated state, determining the load condition and the radio condition, calculating the optimum objective function, optimizing the selection of the awake user equipment set, performing load balancing for the overlapping carriers, and optimizing through the reduction in the signaling overhead.

A transceiver 903 of the subcell performs transmission/reception of a message which the subcell exchanges with the neighbor subcell through a backhaul link, and transmission/reception of a scan message which the subcell exchanges with the user equipment through a wireless channel.

It should be noted that the operations, flows of the signals, and the configuration of apparatuses illustrated through FIGS. 1 to 9 do not limit the scope of the present invention. Particularly, respective operations included in the methods of FIGS. 5, 6, and 8 merely illustrate configurations operated in the controller of the subcell, and it is not required to necessarily include all processes to implement the method.

The above described operations of the subcell may be implemented by using a non-transitory memory apparatus storing a corresponding program code with the controller within the base station apparatus or the subcell apparatus.

That is, the controller of the base station apparatus or the subcell apparatus can execute the above described operations by reading and executing the program code stored in the non-transitory memory apparatus by means of a processor or a Central Processing Unit (CPU). The controller may be implemented in a card type such as a channel card apparatus inserted in the base station apparatus or the subcell apparatus.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for load balancing a serving subcell providing a data service to one or more user equipments in a cellular communication system, the method comprising:
    calculating a load metric by using a radio resource occupation rate of data traffic in one or more scheduling types except for a Best Effort (BE) scheduling type;
    determining whether the serving subcell is in an overload state by using the load metric; and
    triggering a load balancing algorithm when it is determined that the serving subcell is in the overload state,
    wherein the radio resource occupation rate is divided into a DownLink (DL) radio resource occupation rate and an UpLink (UL) radio resource occupation rate, and the calculating of the load metric comprises determining a maximum value between the DL radio resource occupation rate and the UL radio resource occupation rate as the load metric.

2. The method as claimed in claim 1, wherein the determining of whether the serving subcell is in the overload state comprises determining that the serving subcell is in the overload state when the load metric exceeds an overload threshold value for a predetermined time.

3. The method as claimed in claim 2, further comprising deactivating the load balancing algorithm when the load metric becomes a value equal to or smaller than the overload threshold value.

4. The method as claimed in claim 1, wherein the one or more scheduling types except for the BE scheduling type include at least one of an Unsolicited Grant Service (UGS), an extended rtPS (ertPS), a real-time Polling Service (rtPS), and a non rtPS (nrtPS).

5. The method as claimed in claim 1, further comprising:
    transmitting a Spare_Capacity_Request message for requesting available radio resource information of a neighbor subcell to the neighbor subcell; and
    receiving a Spare_Capacity_Report message including information on the DL and UL radio resource occupation rates for data traffic in the one or more scheduling types except for the BE scheduling type and the BE scheduling type of the neighbor subcell from the neighbor subcell.

6. The method as claimed in claim 5, wherein the Spare_Capacity_Report message further includes information on a number of awake user equipments of the neighbor subcell.

7. The method as claimed in claim 5, further comprising selecting a neighbor subcell to receive a handover service by using information on the received DL and UL radio resource occupation rates of the neighbor subcell.

8. The method as claimed in claim 7, further comprising:
    transmitting a SCN-RSP message instructing the one or more user equipments on scanning the selected neighbor subcell; and
    receiving a SCN-REP message reporting a result of the scan for the selected neighbor subcell.

9. The method as claimed in claim 8, further comprising determining one or more candidate user equipment/subcell pairs satisfying an Received Signal Strength Indicator (RSSI) condition and a Carrier to Interference and noise Ratio (CINR) condition from the one or more user equipments and the selected neighbor subcell by using the result of the scan included in the SCN-REP message.

10. The method as claimed in claim 9, further comprising:
    calculating an objective function for the one or more candidate user equipment/subcell pairs, and determining a pair maximizing the objective function as a target user equipment/subcell pair; and
    performing a handover for the target user equipment/subcell pair.

11. The method as claimed in claim 9, wherein selecting of the neighbor subcell, transmitting of the SCN-RSP message, receiving of the SCN-REP message, and determining of the candidate user equipment/subcell pair are repeated a predetermined number of times based on a predetermined period for a first round when the load balancing algorithm is triggered, and selecting of the neighbor subcell is omitted for a predetermined period during a process in which a second round is repeated when no candidate user equipment/subcell pair has been determined for the selected neighbor subcell during a process in which the first round is repeated.

12. The method as claimed in claim 8, further comprising excluding a user equipment in an Initial Network Entry (INE) or Quick Connection Setup (QCS) state and a user equipment entering the subcell through a handover from the one or more user equipments to transmit the SCN-RSP message before transmitting of the SCN-RSP message.

13. The method as claimed in claim 8, further comprising excluding a user equipment providing a data service in UGS and ertPS scheduling types from the one or more user equipments to transmit the SCN-RSP message before transmitting of the SCN-RSP message.

14. The method as claimed in claim 7, further comprising determining one or more candidate user equipment/subcell pairs satisfying a CINR condition from the one or more user equipments and the selected neighbor subcell by considering a CINR for the serving subcell as a CINR of the neighbor subcell, wherein the serving subcell and the neighbor subcell are different carriers used by one sector.

15. The method as claimed in claim 14, further comprising:
    calculating an objective function for the one or more candidate user equipment/subcell pairs, and determining a pair maximizing the objective function as a target user equipment/subcell pair; and
    performing a handover for the target user equipment/subcell pair.

16. An apparatus for load balancing a serving subcell providing a data service to one or more user equipments in a cellular communication system, the apparatus comprising:
    a controller for calculating a load metric by using a radio resource occupation rate of data traffic in one or more scheduling types except for a Best Effort (BE) scheduling type, for determining whether the serving subcell is in an overload state by using the load metric, and for triggering a load balancing algorithm when it is determined that the serving subcell is in the overload state,
    wherein the radio resource occupation rate is divided into a DownLink (DL) radio resource occupation rate and an UpLink (UL) radio resource occupation rate, and the controller determines a maximum value between the DL radio resource occupation rate and the UL radio resource occupation rate as the load metric.

17. The apparatus as claimed in claim 16, wherein the controller determines that the serving subcell is in the overload state when the load metric exceeds an overload threshold value for a predetermined time.

18. The apparatus as claimed in claim 17, wherein the controller deactivates the load balancing algorithm when the load metric becomes a value equal to or smaller than the overload threshold value.

19. The apparatus as claimed in claim 16, wherein the one or more scheduling types except for the BE scheduling type include at least one of an Unsolicited Grant Service (UGS), an extended rtPS (ertPS), a real-time Polling Service (rtPS), and a non rtPS (nrtPS).

20. The apparatus as claimed in claim 16, further comprising a transceiver for transmitting a Spare_Capacity_Request message for requesting available radio resource information of a neighbor subcell to the neighbor subcell, and receiving a Spare_Capacity_Report message including information on the DL and UL radio resource occupation rates for data traffic in the one or more scheduling types except for the BE scheduling type and the BE scheduling type of the neighbor subcell from the neighbor subcell.

21. The apparatus as claimed in claim 20, wherein the Spare_Capacity_Report message further includes information on a number of awake user equipments of the neighbor subcell.

22. The apparatus as claimed in claim 20, wherein the controller selects a neighbor subcell to receive a handover service by using information on the received DL and UL radio resource occupation rates of the neighbor subcell.

23. The apparatus as claimed in claim 22, wherein the transceiver transmits a SCN-RSP message instructing the one or more user equipments on scanning the selected neighbor subcell, and receives a SCN-REP message reporting a result of the scan for the selected neighbor subcell.

24. The apparatus as claimed in claim 23, wherein the controller further determines one or more candidate user equipment/subcell pairs satisfying an Received Signal Strength Indicator (RSSI) condition and a Carrier to Interference and noise Ratio (CINR) condition from the one or more user equipments and the selected neighbor subcell by using the result of the scan included in the SCN-REP message.

25. The apparatus as claimed in claim 24, wherein the controller calculates an objective function for the one or more candidate user equipment/subcell pairs, determines a pair maximizing the objective function as a target user equipment/subcell pair, and performs a handover for the target user equipment/subcell pair.

26. The apparatus as claimed in claim 24, wherein a process of selecting the neighbor subcell, a process of transmitting the SCN-RSP message, a process of receiving the SCN-REP message, and a process of determining the candidate user equipment/subcell pair are repeated a predetermined number of times based on a predetermined period for a first round when the controller triggers the load balancing algorithm, and a process of selecting the neighbor subcell is skipped for a predetermined period during a process in which a second round is repeated when the controller cannot determine any candidate user equipment/subcell pair for the selected neighbor subcell during a process in which the first round is repeated.

27. The apparatus as claimed in claim 23, wherein the controller excludes a user equipment in an Initial Network Entry (INE) or Quick Connection Setup (QCS) state and a user equipment entering the subcell through a handover from the one or more user equipments to transmit the SCN-RSP message before the transceiver transmits the SCN-RSP message.

28. The apparatus as claimed in claim 23, wherein the controller excludes a user equipment providing a data service in UGS and ertPS scheduling types from the one or more user equipments to transmit the SCN-RSP message before the transceiver transmits the SCN-RSP message.

29. The apparatus as claimed in claim 22, wherein the serving subcell and the neighbor subcell are different carriers used by one sector, and the controller determines one or more candidate user equipment/subcell pairs satisfying a CINR condition from the one or more user equipments and the selected neighbor subcell by considering a CINR for the serving subcell as a CINR of the neighbor subcell.

30. The apparatus as claimed in claim 29, wherein the controller calculates an objective function for the one or more candidate user equipment/subcell pairs, determines a pair maximizing the objective function as a target user equipment/subcell pair, and performs a handover for the target user equipment/subcell pair.

* * * * *